(12) United States Patent
Suzuki et al.

(10) Patent No.: US 10,907,552 B2
(45) Date of Patent: Feb. 2, 2021

(54) CONTROL METHOD AND CONTROL DEVICE FOR INTERNAL COMBUSTION ENGINE

(71) Applicant: Nissan Motor Co., Ltd., Kanagawa (JP)

(72) Inventors: Kenji Suzuki, Kanagawa (JP); Hirofumi Miyauchi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 16/643,407

(22) PCT Filed: Aug. 31, 2017

(86) PCT No.: PCT/JP2017/031310
§ 371 (c)(1),
(2) Date: Feb. 28, 2020

(87) PCT Pub. No.: WO2019/043860
PCT Pub. Date: Mar. 7, 2019

(65) Prior Publication Data
US 2020/0386170 A1 Dec. 10, 2020

(51) Int. Cl.
*F02D 15/02* (2006.01)
*F02D 13/02* (2006.01)
*F02D 41/00* (2006.01)

(52) U.S. Cl.
CPC ......... *F02D 15/02* (2013.01); *F02D 13/0269* (2013.01); *F01L 2800/00* (2013.01);
(Continued)

(58) Field of Classification Search
CPC ...... F02D 13/02; F02D 13/0269; F02D 15/02; F02D 41/22; F02D 45/00; F01L 1/34; F02B 75/04
See application file for complete search history.

(56) References Cited

U.S. PATENT DOCUMENTS 8,935,076 B2 * 1/2015 Ide .................. F01L 1/185
701/102
2005/0092272 A1 * 5/2005 Shindou ............ F02D 41/221
123/90.16

(Continued)

FOREIGN PATENT DOCUMENTS

JP  2004-116434 A  4/2004
JP  2006-105095 A  4/2006
(Continued)

*Primary Examiner* — John Kwon
*Assistant Examiner* — Johnny H Hoang
(74) *Attorney, Agent, or Firm* — Osha Bergman Watanabe & Burton LLP

(57) ABSTRACT

An internal combustion engine (1) has a variable compression ratio mechanism (2) that varies a mechanical compression ratio and a variable valve timing mechanism (7) that varies a valve timing of an intake valve (4). When there is a demand to execute reference position learning (step 21) for system calibration of the variable valve timing mechanism (7), the execution of the reference position learning is permitted on the condition that the mechanical compression ratio is higher than a threshold value VCRth (step 22). When any anomaly is present in the variable compression ratio mechanism (2), the reference position learning of the variable valve timing mechanism (7) is prohibited (steps 23 and 25).

3 Claims, 4 Drawing Sheets

(52) U.S. Cl.
    CPC .... *F02D 13/0234* (2013.01); *F02D 2041/001* (2013.01); *F02D 2700/03* (2013.01)

(56) References Cited

U.S. PATENT DOCUMENTS

| | | | |
|---|---|---|---|
| 2005/0217620 A1* | 10/2005 | Shindou | F02D 13/0261 123/90.15 |
| 2006/0169246 A1* | 8/2006 | Asai | F01L 13/0047 123/305 |
| 2010/0217504 A1* | 8/2010 | Fujii | F02D 13/0226 701/105 |
| 2011/0290217 A1* | 12/2011 | Kimura | F02D 41/221 123/48 C |
| 2013/0055989 A1* | 3/2013 | Kawasaki | F02D 13/0238 123/48 C |

FOREIGN PATENT DOCUMENTS

| | | |
|---|---|---|
| JP | 2006-161583 A | 6/2006 |
| JP | 2006-161683 A | 6/2006 |
| JP | 2006-220079 A | 8/2006 |
| JP | 2010-043544 A | 2/2010 |
| JP | 2012-132345 A | 7/2012 |

* cited by examiner

CONTROL METHOD AND CONTROL DEVICE FOR INTERNAL COMBUSTION ENGINE

FIELD OF THE INVENTION

The present invention relates to a control method and control device adapted, for use in an internal combustion engine equipped with a variable compression ratio mechanism capable of varying a mechanical compression ratio of the internal combustion engine and a variable valve timing mechanism capable of varying a closing timing of an intake valve, to perform reference position learning of the variable valve timing mechanism.

BACKGROUND ART

Patent Document 1 discloses a control device configured to, when a learning operation for a variable valve timing mechanism is demanded, execute the learning operation by temporarily controlling the variable valve timing mechanism to the most retarded position as a reference position and reading an output value of a cam angle sensor at that time.

Patent Document 2 discloses a variable compression ratio mechanism provided with a multi-link piston-crank unit to vary a mechanical compression ratio of an internal combustion engine by vertically moving the top dead center position of the piston. Patent Document 2 further discloses a control method in which, when any anomaly in the variable compression ratio mechanism is detected, the timing of ignition is controlled by considering the actual compression ratio to be the maximum compression ratio for prevention of knocking.

In the case of an internal combustion engine equipped with both a variable valve timing mechanism for an intake valve and a variable compression ratio mechanism, there is a possibility that a learning operation for the variable valve timing mechanism is demanded under the situation that the mechanical compression ratio is set low. In such a case, the compression end temperature in the combustion chamber of the internal combustion engine is lowered due to not only the low compression ratio, but also decrease of the effective compression ratio by retardation of the intake valve closing timing, when the variable valve timing mechanism is controlled to the most retarded position or relatively retard-side reference position for the purpose of execution of the learning operation. This results in instability of combustion.

The above problem cannot be avoided by the control method of Patent Document 2.

PRIOR ART DOCUMENTS

Patent Document

Patent Document 1: Japanese Laid-Open Patent Publication No. 2006-220079
Patent Document 2: Japanese Laid-Open Patent Publication No. 2006-161683

SUMMARY OF THE INVENTION

The present invention is directed to learning control in which, when there is a demand to execute a reference position learning operation of controlling a variable valve timing mechanism to a predetermined reference position and then reading a sensor value, the execution of the reference position learning operation is permitted on the condition that a mechanical compression ratio controlled by a variable compression ratio mechanism is higher than a predetermined compression ratio value.

This learning control has the effect of, even when the valve timing is temporality retarded toward the reference position for the purpose of execution of the learning operation, preventing excessive lowering of the compression end temperature by the action of the high mechanical compression ratio and thereby suppressing combustion instability during the execution of the learning operation.

DESCRIPTION OF EMBODIMENTS

Hereinafter, one embodiment of the present invention will be described below with reference to the drawings.

Figure 1:
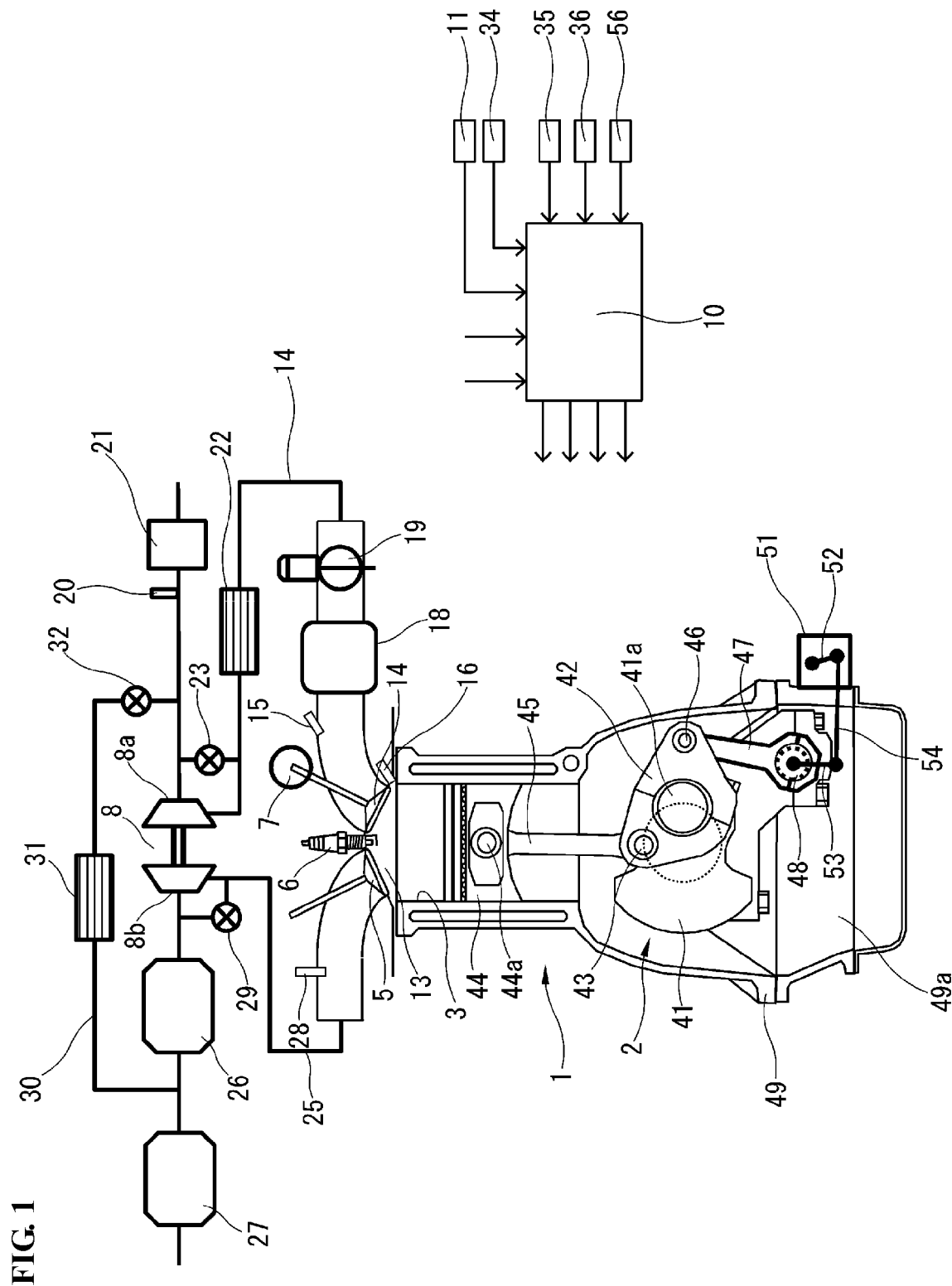
FIG. 1 is a schematic view showing a system configuration of an internal combustion engine according to one embodiment of the present invention.

FIG. 1 shows a system configuration of an internal combustion engine 1 to which the present invention is applicable. The internal combustion engine 1 is in the form of a four-stroke-cycle spark-ignition type internal combustion engine equipped with a variable compression ratio mechanism 2 using a multi-link piston-crank unit. In the internal combustion engine, a pair of intake valves 4 and a pair of exhaust valves 5 are arranged on a ceiling wall surface of each cylinder 3; and a spark plug 6 is arranged on a center part of the ceiling wall surface surrounded by the intake valves 4 and the exhaust valves 5. The internal combustion engine 1 is also equipped with a turbocharger 8 as illustrated in the present embodiment.

An intake-side variable valve timing mechanism 7 is provided on the intake valves 4 so as to vary and control the opening and closing timings of the intake valves 4. The variable valve timing mechanism 7 is of any type as long as it is capable of advancing or retarding at least the intake valve closing timing. In the present embodiment, the variable valve timing mechanism 7 is configured to advance or retard the intake valve opening timing and the intake valve closing timing simultaneously by advancing or retarding the phase of a camshaft. As such a variable valve timing mechanism, various types are known and usable. In the present invention, the variable valve timing mechanism is not limited to the above specific configuration.

For example, the variable valve timing mechanism 7 includes a sprocket arranged coaxially on a front end portion of the camshaft and a hydraulic rotary actuator arranged to cause relative rotation of the sprocket and the camshaft within a predetermined angle range. The sprocket is linked to a crankshaft via a timing chain or timing belt (not shown). Accordingly, the phase of the camshaft relative to the crank angle is changed by relative rotation of the sprocket and the camshaft. The rotary actuator has an advance-side hydraulic chamber for applying a hydraulic biasing force toward the advance side and a retard-side hydraulic chamber for applying a hydraulic biasing force toward the retard side, and advances or retards the phase of the camshaft by controlling the supply of hydraulic pressure to these hydraulic chambers through a hydraulic control valve (not shown) according to a control signal from an engine controller 10. By a cam angle sensor 11 which is responsive to a rotational position of the camshaft, the actual control position of the camshaft (corresponding to the actual valve timing) varied and controlled by the variable valve timing mechanism 7 is detected. The supply of hydraulic pressure through the hydraulic control valve is controlled by a closed loop control method such that the actual control position of the camshaft detected by the cam angle sensor 11 is adjusted to a target control position set according to operating conditions.

An intake passage 14 is connected to a combustion chamber 13 of the internal combustion engine through the intake valves 4. In the intake passage 14, a fuel injection valve 15 for port injection is provided on each cylinder. Further, a fuel injection valve 16 for in-cylinder injection is provided so as to directly inject fuel into each cylinder 3. In other words, the internal combustion engine is equipped with a dual-injection type fuel injection system so that the supply of fuel is controlled by properly using the fuel injection valve 15 for port injection and the fuel injection valve 16 for in-cylinder injection according to a load etc. An intake collector 14 is provided in the intake passage 14. An electronically-controlled throttle valve 19, whose opening is controlled according to a control signal from the engine controller 10, is disposed in the intake passage 14 at a position upstream of the intake controller 14. A compressor 8a of the turbocharger 8 is disposed in the intake passage at a position upstream of the throttle valve 16. An air flow meter 20 for detecting an intake air amount and an air cleaner 21 are disposed at positions upstream of the compressor 8a in the intake passage 14. An intercooler 22 is provided between the compressor 8a and the throttle valve 19. A recirculation valve 23 is provided so as to provide communication between the discharge side and intake side of the compressor 8a. This recirculation valve 23 is opened in a deceleration state where the throttle valve 19 is closed.

An exhaust passage 25 is connected to the combustion chamber 13 of the internal combustion engine through the exhaust valves 5. A turbine 8b of the turbocharger 8 is disposed in the exhaust passage 25. A pre-catalytic unit 26 and a main catalytic unit 27, each of which is provided with a three-way catalyst, are disposed in the exhaust passage 25 at positions downstream of the turbine 8b. An air-fuel ratio sensor 28 for detecting an air-fuel ratio is disposed at a position upstream of the turbine 8b in the exhaust passage 25. For control of boost pressure, a wastegate valve 29 is provided in the turbine 8b so as to bypass a part of exhaust gas according to the boost pressure.

An exhaust gas recirculation passage 30 is arranged between a portion of the exhaust passage 25 downstream of the turbine 8b and a portion of the intake passage 14 upstream of the compressor 8a, and is provided with an EGR gas cooler 31 and an EGR valve 32.

Into the engine controller 10, there are inputted detection signals of various sensors. These various sensors include not only the cam angle sensor 11, the air flow mater 20 and the air-fuel ratio sensor 28, but also a crank angle sensor 34 for detecting an engine rotation speed, a coolant sensor 35 for detecting a coolant temperature, an accelerator opening sensor 36 for detecting a depression amount of an accelerator pedal operated by a driver, and the like. Based on these sensor detection signals, the engine controller 10 optimally controls the amounts and timings of fuel injection by the fuel injection valves 15 and 16, the timing of ignition by the spark plug 6, the mechanical compression ratio of the internal combustion engine by the variable compression ratio mechanism 2, the opening and closing timings of the intake valves 4 by the variable valve timing mechanism 7, the opening of the throttle valve 19, the opening of the EGR valve 32 and the like.

On the other hand, the variable compression ratio mechanism 2 is of the type using a known multi-link piston-crank unit as disclosed in Patent Document 2, Japanese Laid-Open Patent Publication No. 2004-116434 or the like. More specifically, the variable compression ratio mechanism 2 mainly includes: a lower link rotatably supported on a crank pin 41a of the crankshaft 41; an upper link 45 connecting an upper pin 43 on one end portion of the lower link 42 and a piston pin 44a of a piston 44 to each other; a control link 47 connected at one end thereof to a control pin 46 on the other end portion of the lower link 42; and a control shaft 48 pivotally supporting the other end of the control link 47. The crankshaft 41 and the control shaft 48 are rotatably supported via a bearing structure (not shown) within a crankcase 49a at a lower portion of a cylinder block 49. The control shaft 48 has an eccentric shaft part whose position is changed with rotation of the control shaft 48. The thus-configured variable compression ratio mechanism 2 vertically moves the top dead center position of the piston 44 with rotation of the control shaft 48, thereby varying the mechanical compression ratio.

In the present embodiment, an electric actuator 51 is provided as a driving unit for causing the variable compression ratio mechanism 2 to vary and control the mechanical compression ratio. The electric actuator 51 is disposed on an outer wall surface of the crank case 49a, and has a rotational center shaft arranged in parallel with the crankshaft 41. A first arm 52 is fixed to an output rotation shaft of the electric actuator 51, whereas a second arm 53 is fixed to the control shaft 48. These arms are coupled by an intermediate link 54. The electric actuator 51 and the control shaft 48 are thus interlocked with each other through the first arm 52, the second arm 53 and the intermediate link 54. The electric actuator 51 includes an electric motor and a transmission unit arranged in series along an axial direction thereof.

The actual value of the mechanical compression ratio varied and controlled as mentioned above by the variable compression ratio mechanism 2, that is, the actual compression ratio is detected by an actual compression ratio sensor 56. The actual compression ratio sensor 56 has, for example, a rotary potentiometer or rotary encoder that detects a rotational angle of the control shaft 48 or a rotational angle of the output rotation shaft of the electric actuator 51. The actual compression ratio can alternatively be detected, without using a separate sensor, by calculating the rotation amount of the electric motor from a control signal outputted to the electric motor of the electric actuator and then determining the rotational angle of the control shaft 48 based on the calculated rotation amount.

The electric actuator 51 is driven and controlled by the engine controller 11 such that the actual compression ratio as determined above is adjusted to a target compression ratio set according to operating conditions. For example, the engine controller 10 has a target compression ratio map using a load and rotation speed of the internal combustion engine 1 as parameters and sets the target compression ratio based on this map. Basically, the target compression ratio is set high in a low load region. As the load becomes higher, the target compression ratio is set lower for prevention of knocking etc.

Next, the control of the variable valve timing mechanism 7 executed by the engine controller 10 will be explained below by referring to flowcharts of FIGS. 2 to 4. Herein, the routines of these flowcharts are repeatedly executed at appropriate intervals (e.g. very small time intervals).

Figure 2:
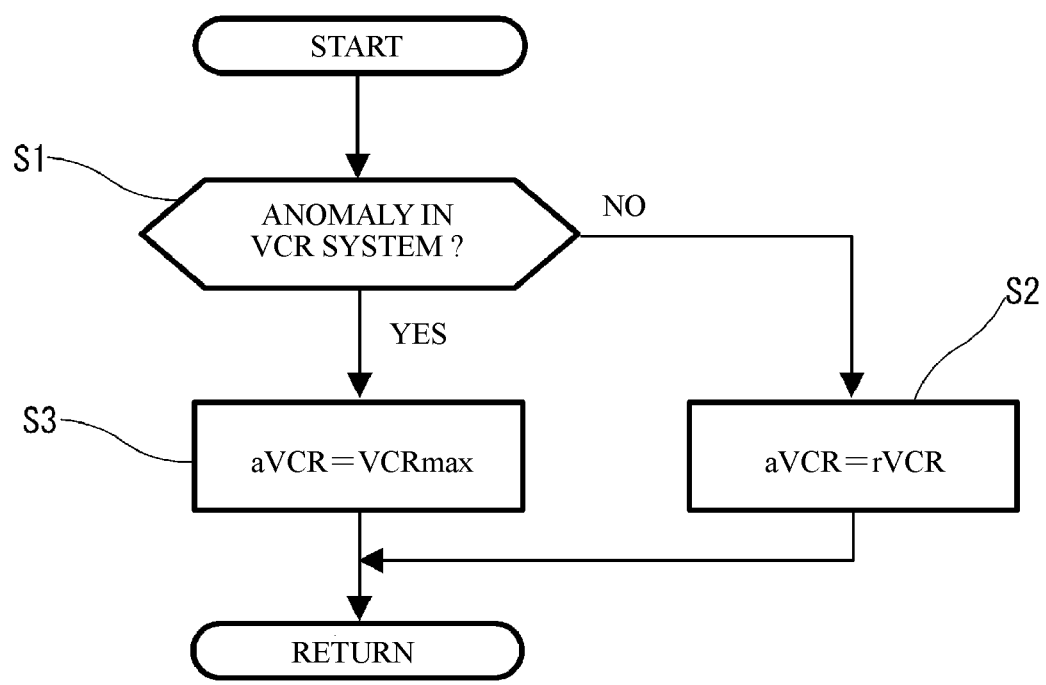
FIG. 2 is a flowchart showing a process of setting a compression ratio for VTC control according to the one embodiment of the present invention.

FIG. 2 shows a flowchart for setting a VTC control compression ratio aVCR as one of control parameters for the variable valve timing mechanism 7 (VTC). In step 1 (referred to as S 1 in the figure; the same applies to the other steps), it is judged whether or not any anomaly is present in the variable compression ratio mechanism 2 (VCR). The target of judgment as to the presence or absence of any anomaly includes not only the mechanical configuration of the variable compression ratio mechanism 2 but also the related hardware such as sensor and actuator and the control system software. In other words, anomaly diagnosis is performed on the entire variable compression ratio system including the variable compression ratio mechanism 2 in this step. Typical examples of the anomaly are a defect in the electric actuator 51 of the variable compression ratio mechanism 2, a defect in the actual compression ratio sensor 56 and the like. The presence or absence of these anomalies is diagnosed successively or at proper timings under self-diagnosis function achieved by another routine process (not shown). In step 1, the judgment is made by referring to the results of the diagnosis.

When the variable compression ratio system is in normal operation, the routine proceeds to step 2. In step 2, the actual compression ratio rVCR detected by the actual compression ratio sensor 56 at the current time is set as it is as the VTC control compression ratio aVCR. On the other hand, the routine proceeds to step 3 when any anomaly is present in the variable compression ratio system. In step 3, a maximum compression ratio VCRmax achievable by the variable compression ratio mechanism 2 is set as the VTC control compression ratio aVCR. The reliability of the detected actual compression ratio value rVCR is low when any anomaly is present in the variable compression ratio system. In such an abnormal state, the mechanical compression ratio is considered to be the maximum compression ratio vCRmax in the control of the variable valve timing mechanism 7, in order to reliably avoid interference of the intake valves 4 and the piston 44 in the vicinity of the top dead center.

Figure 3:
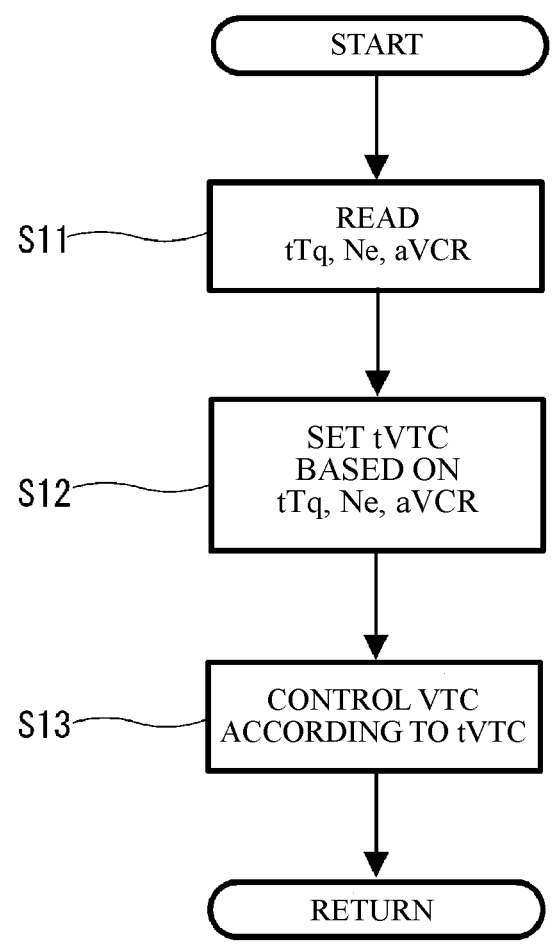
FIG. 3 is a flowchart showing a process of VTC control according to the one embodiment of the present invention.

FIG. 3 shows a flowchart for the main routine of the control of the variable valve timing mechanism 7. In step 11, the target engine torque tTq and the engine rotation speed Ne are read as engine operating conditions. The above-mentioned VTC control compression ratio aVCR is also read as an additional parameter to avoid interference of the intake valves 4 and the piston 44. The target engine torque tTq corresponds to the load of the internal combustion engine 1, and can be determined from the accelerator opening (accelerator pedal depression amount) detected by the accelerator opening sensor 36, the intake air amount detected by the air flow meter 20 and the like. In step 12, the target control position tVTC of the variable valve timing mechanism 7 is set based on the target engine torque tTq, the engine rotation speed Ne and the VTC control compression ratio aVCR. The target control position tVTC is set to an optimum value determined from the target engine torque tTq and the engine rotation speed Ne, within the range determined from the VTC control compression ratio aVCR to avoid interference of the intake valves 4 and the piston 44. In step 13, the variable valve timing mechanism 7 is controlled according to the target control position tVTC.

As mentioned above, the VTC control compression ratio aVCR is set to the actual compression ratio rVCR when the variable compression ratio system is in normal operation. By this setting, interference of the intake valves 4 and the piston 4 is reliably avoided even in the case where there is a delay in response to changes of the actual compression ratio during a transient state such as acceleration of the internal combustion engine 1. When any anomaly is present in the variable compression ratio system, on the other hand, the VTC control compression ratio aVCR is set to the maximum compression ratio VCRmax. By this setting, interference of the intake valves 4 and the piston 4 is reliably avoided even in the state where the actual compression ratio is indefinite.

Figure 4:
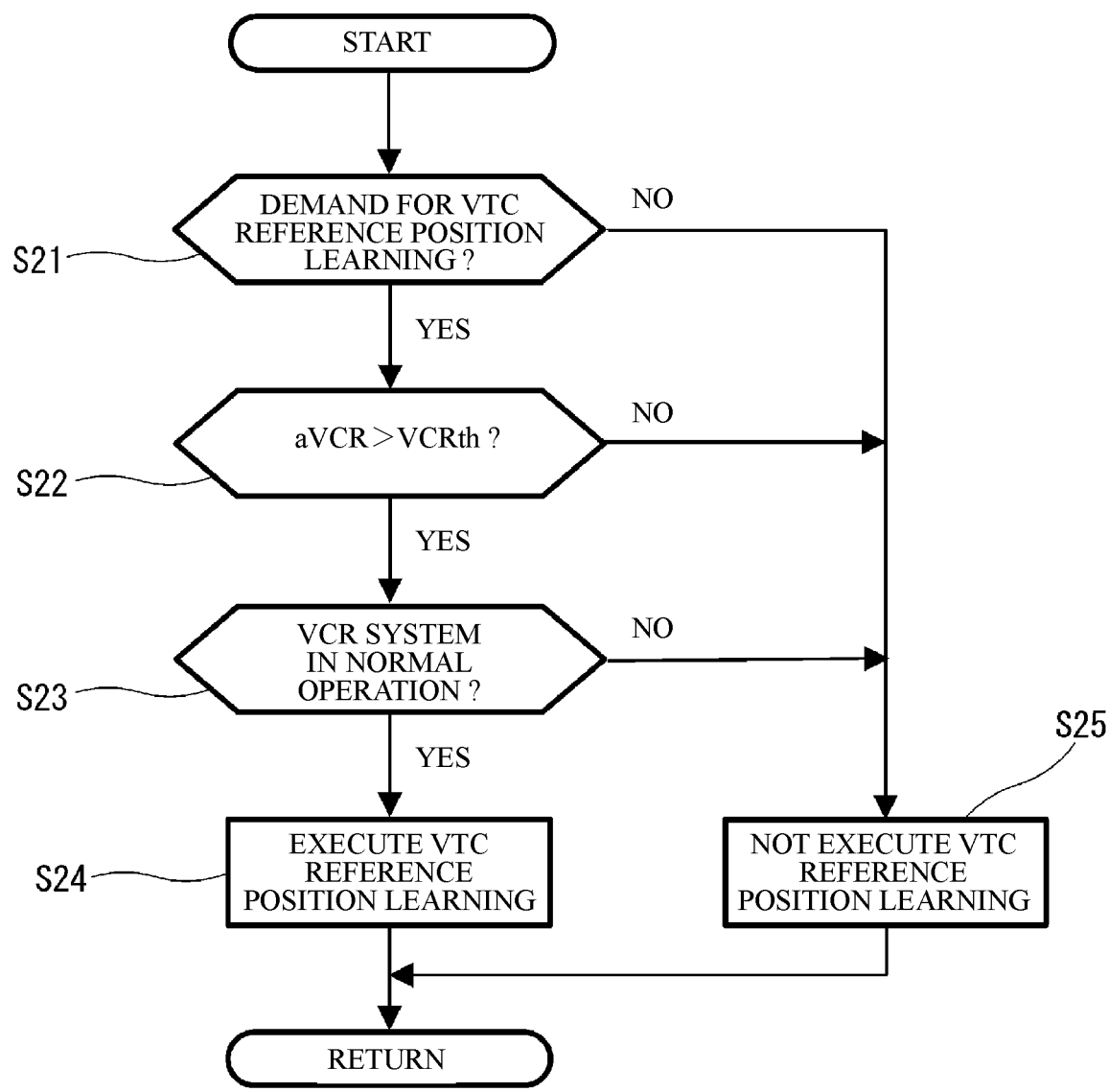
FIG. 4 is a flowchart showing a process of VTC reference position learning according to the one embodiment of the present invention.

FIG. 4 shows a flowchart for reference position learning of the variable valve timing mechanism 7. The reference position learning refers to a processing operation of, for control system calibration of the variable valve timing mechanism 7, e.g. temporarily moving the hydraulic rotary actuator to a mechanically-limited reference position and reading a detection value of the cam angle sensor 11 in a state where the rotary actuator has been controlled to the reference position. In the present embodiment, the learning operation is executed by retarding the rotary actuator most to its physical limit position and learning this most retarded position as the reference position. It is alternatively feasible to provide a lock mechanism immediately before the mechanically-limited most retarded position and learn a most retarded position of the rotary actuator limited by the lock mechanism as the reference position.

In step 21, it is judged whether or not there is a demand for a learning operation for the variable valve timing mechanism 7. The demand for the learning operation is outputted by another routine process when a predetermined condition is satisfied after a start of driving operation of the internal combustion engine. The judgment is made according to the presence or absence of the output in step 21. It is preferable to execute at least one leaning learning operation during one trip. The demand for the learning operation may be outputted immediately after a start of operation (e.g. immediately after a start of automatic operation) of the internal combustion engine 1.

When there is no demand for the learning operation, the routine proceeds from step 21 to step 25. In step 25, the driving operation of the internal combustion engine 1, that is, the normal control of the variable valve timing mechanism 7 is continued without the execution of the reference position learning operation.

When it is judged in step 21 that the learning operation is demanded, the routine proceeds to step 22. In step 22, the VTC control compression ratio aVCR is compared with a predetermined compression ratio threshold value VCRth. When the VTC control compression ratio aVCR is lower than or equal to the compression ratio threshold value VCRth, the routine proceeds from step 22 to step 25 so that the learning operation is not executed. In other words, the execution of the reference position learning operation is prohibited when the VTC control compression ratio aVCR is lower than or equal to the compression ratio threshold value VCRth. If the variable valve timing mechanism 7 is moved to the most retarded position for the purpose of execution of the learning operation under the situation that the mechanical compression ratio is controlled to a low value, there is a possibility of combustion instability with lowering of the compression end temperature in the combustion chamber due to not only the low mechanical compression ratio but also decrease of the effective compression ratio by retardation of the intake valve closing timing. For this reason, the learning operation is not executed when the VTC control compression ratio aVCR corresponding to the actual compression ratio rVCR is lower than or equal to the compression ratio threshold value VCRth. The compression ratio threshold value VCRth is set to a mechanical compression ratio level at which combustion instability does not occur even when the variable valve timing mechanism 7 is controlled to the reference position i.e. the most retarded position for the purpose of execution of the learning operation.

When the VTC control compression ratio aVCR is higher than the compression ratio threshold value VCRth, the routine proceeds to step 23. In step 23, it is judged whether or not the variable compression ratio mechanism 2 (VCR) is in normal operation. This step is carried out by performing self-diagnosis as to the presence or absence of any anomaly in the mechanical configuration of the variable compression ratio mechanism 2, the related hardware such as sensor and actuator and the control system software, and then, referring to the results of the self-diagnosis as in the case of the above-mentioned step 1. When any anomaly is present in the variable compression ratio system, the routine proceeds to step 25 so that the learning operation is not executed. In other words, the learning operation for the variable valve timing mechanism 7 is prohibited when any anomaly is present in the variable compression ratio system. This is because, when any anomaly is present in the variable compression ratio system, there is a possibility that the actual mechanical compression ratio of the internal combustion engine 1 is lower than or equal to the compression ratio threshold value VCRmax although the VTC control compression ratio aVCR has been set to the maximum compression ratio VCRmax in step 3.

When it is judged in step 23 that the variable compression ratio mechanism 2 is in normal operation, the routine proceeds to step 24. In step 24, the learning operation for the variable valve timing mechanism 7 is executed. More specifically, the detection value of the cam angle sensor 11 is read in a state where the variable valve timing mechanism 7 is temporarily moved to the most retarded position as the reference position as mentioned above. After the completion of the learning operation, the routine returns to the normal control.

As mentioned above, the learning operation for the variable valve timing control mechanism 7 is permitted on the conditions that: the variable compression ratio mechanism 2 is in normal operation; and the actual mechanical compression ratio is higher than the compression ratio threshold value VCRth in the present embodiment. In the presence of an anomaly in the variable compression ratio mechanism 2, interference of the intake valves 4 and the piston 4 is reliably avoided by considering the mechanical compression ratio (VTC control compression ratio aVCR) to be the maximum compression ratio VCRmax in the control of the variable valve timing mechanism 7; and the learning operation for the variable valve timing mechanism 7 is prohibited irrespective of the value of the VTC control compression ratio aVCR. This makes it possible to, in the presence of any anomaly in the variable compression ratio mechanism 2, prevent instability of combustion caused by retardation of the valve timing for execution of the learning operation.

The reference position for the learning operation is not limited to the most retarded position as in the above embodiment. For example, in the case where a lock mechanism is provided to the rotary actuator of the variable valve timing mechanism 7, an arbitrary control position of the rotary actuator limited by the lock mechanism can be utilized as the reference position.

The invention claimed is:

1. A control method for an internal combustion engine, the internal combustion engine comprising:
    a variable compression ratio mechanism that varies a mechanical compression ratio of the internal combustion engine; and
    a variable valve timing mechanism that varies a closing timing of an intake valve, the internal combustion engine having a possibility of combustion instability in a state that the mechanical compression ratio is low and the closing timing of the intake valve is on a retard side,
the control method comprising:
    setting a target compression ratio of the variable compression ratio mechanism and a target control position of the variable valve timing mechanism according to operating conditions of the internal combustion engine;
    judging whether or not an anomaly is present in the variable compression ratio mechanism, wherein the setting includes:
        when the variable compression ratio mechanism is judged as normal, setting the target control position of the variable valve timing mechanism by using a current value of the mechanical compression ratio as a parameter; and
        when it is judged that any anomaly is present in the variable compression ratio mechanism, setting the target control position of the variable valve timing mechanism by considering the mechanical compression ratio to be a maximum compression ratio value achievable by the variable compression ratio mechanism;
    when there is a demand for a reference position learning operation of controlling the variable valve timing mechanism to a most retarded position and then learning a sensor value of the most retarded position as a reference position, permitting the execution of the reference position learning operation on the condition that the mechanical compression ratio controlled by the variable compression ratio mechanism is higher than a predetermined compression ratio threshold value, wherein the compression ratio threshold value is a value of the mechanical compression ratio at which no combustion instability occurs even when the variable valve timing mechanism is controlled to the most retarded position; and
    prohibiting the execution of the reference position learning operation when it is judged that any anomaly is present in the variable compression ratio mechanism.

2. The control method for the internal combustion engine according to claim 1, wherein the variable compression ratio mechanism varies the mechanical compression ratio by changing a relative positional relationship of a piston and a cylinder.

3. A control device for an internal combustion engine, the internal combustion engine comprising:
    a variable compression ratio mechanism that varies a mechanical compression ratio of the internal combustion engine; and
    a variable valve timing mechanism that varies a closing timing of an intake valve, the internal combustion engine having a possibility of combustion instability in a state that the mechanical compression ratio is low and the closing timing of the intake valve is on a retard side, the control device comprising:
- a compression ratio control section configured to set a target compression ratio of the variable compression ratio mechanism according to operating conditions of the internal combustion engine;
- a valve timing control section configured to set a target control position of the variable valve timing mechanism according to operating conditions of the internal combustion engine;
- a learning control section configured to, when there is a demand for a reference position learning operation of controlling the variable valve timing mechanism to a most retarded position and then learning a sensor value of the most retarded position as a reference position, execute the reference position learning operation on the condition that the mechanical compression ratio controlled by the variable compression ratio mechanism is higher than a predetermined compression ratio threshold value, and
- an anomaly judgment section configured to judge whether or not an anomaly is present in the variable compression ratio mechanism,
- wherein the compression ratio threshold value is a value of the mechanical compression ratio at which no combustion instability occurs even when the variable valve timing mechanism is controlled to the most retarded position,
- wherein the valve timing control section is configured to:
  - when the anomaly judgment section judges that the variable compression ratio mechanism is normal, set the target control position of the variable valve timing mechanism by using a current value of the mechanical compression ratio as a parameter; and
  - when the anomaly judgment section judges that any anomaly is present in the variable compression ratio mechanism, set the target control position of the variable valve timing mechanism by considering the mechanical compression ratio to be a maximum compression ratio value achievable by the variable compression ratio mechanism, and
- wherein the learning control section is configured to, when the anomaly judgment section judges that any anomaly is present in the variable compression ratio mechanism, prohibit the execution of the reference position learning operation.

* * * * *